United States Patent [19]

Herchenbach et al.

[11] Patent Number: 4,507,153

[45] Date of Patent: Mar. 26, 1985

[54] METHOD AND APPARATUS FOR THE HEAT TREATMENT OF A FINE GRAINED PRODUCT

[75] Inventors: Horst Herchenbach, Hennef; Albrecht Wolter, Cologne; Eberhard Steinbiss, Düsseldorf, all of Fed. Rep. of Germany

[73] Assignee: Klöckner-Humboldt-Wedag AG, Fed. Rep. of Germany

[21] Appl. No.: 532,846

[22] Filed: Sep. 16, 1983

[30] Foreign Application Priority Data

Oct. 8, 1982 [DE] Fed. Rep. of Germany ....... 3237343

[51] Int. Cl.³ ................................................ C04B 7/44
[52] U.S. Cl. ..................................... 106/100; 432/13; 432/18; 432/106
[58] Field of Search ..................... 106/100; 432/13, 18, 432/106

[56] References Cited

FOREIGN PATENT DOCUMENTS

| | | | |
|---|---|---|---|
| 0052429 | 5/1982 | European Pat. Off. | 432/13 |
| 0052431 | 5/1982 | European Pat. Off. | 13/ |
| 2550384 | 8/1978 | Fed. Rep. of Germany | 432/13 |

Primary Examiner—James Poer
Attorney, Agent, or Firm—Hill, Van Santen, Steadman & Simpson

[57] ABSTRACT

A method and apparatus for burning fine grained products, such as in the manufacture of cement clinker from raw cement meal wherein preheated, calcined meal is heated in a separate heating assembly to a temperature from approximately 900° C. to approximately 1250° C. and is then sintered into clinker in a burning assembly such as a rotary tubular kiln. The present invention provides a means for achieving a fast and uniform continuous heating in the heating assembly without reaching the critical temperature of melt phase formation and without danger of encrustations, the heat required for rapid heating being released in controlled amounts in the heating assembly, where it is immediately absorbed by the product, the heat being provided by a plurality of points of fuel introduction and/or combustion air introduction distributed over the heating assembly.

18 Claims, 4 Drawing Figures

METHOD AND APPARATUS FOR THE HEAT TREATMENT OF A FINE GRAINED PRODUCT

BACKGROUND OF THE INVENTION

1. Field of the Invention

This invention relates to a method and apparatus for heat treatment of a preheated, largely calcined, fine grained product which consists of or contains lime, particularly raw cement meal. The meal is heated in a heating assembly from the temperature level of the decomposition of calcium carbonate (approximately 900° C.) to the temperature at which alite formation begins (approximately 1250° C.) and is then sintered into clinker in a burning assembly.

2. Description of the Prior Art

The dry burning method is used predominantly at present for the manufacture of cement, particularly portland cement, for reasons of heat efficiency. Originally, the entire process of preheating, deacidification and sintering were carried out in a rotary tubular kiln. Then, the step of preheating of the material was shifted to a heat exchanger outside the rotary tubular kiln. Finally, the deacidification step with its relatively high heat consumption was transferred to a separate calciner. These improvements have the advantage that due to better heat transmission with the fine grained product in suspension in hot gases, both the preheating as well as the calcination were significantly more efficient than in a product bed, as a result of which the specific heat consumption when burning cement could be considerably reduced.

Approximately 30 to 40% of the overall fuel charge is still used for the sintering burning in the rotary tubular kiln when there are separate heat treatment steps and complete deacidification in a calciner. The term "sintering burning" includes the heating of the product from 900° C. following the calcination up to a temperature in the range where alite formation begins (approximately 1250° C.) and the range of partial melting (above approximately 1300° to 1340° C.) as well as the dwell time of the material at this high temperature range up to a nearly complete bonding of the free CaO as alite.

Various investigations have come to the conclusion that it is highly desirable to quickly heat the calcined material to sintering temperature since, by so doing, the activity of the calcined material can be exploited with low heterogeneity for an accelerated lime bonding (i.e., alite formation). In standard cement burning installations, where not only the heating but also the sintering must be performed in the same rotary tubular kiln, the demand for fast heating by means of an increase of conveying speed in the kiln, however, can only be carried out very incompletely since the sintering requires exactly the opposite condition, namely, a dwell time for the material.

There have been a number of proposals which seek to realize a faster heating of the deacidified material to sintering temperature. Some solutions make use of a rapid heating which occurs outside of the rotary kiln (EP OS 52 429 and EP OS 52 431). In these proposals, the deacidified raw cement meal is placed in suspension with hot exhaust air from the clinker cooler and is heated from a temperature of 800° through 850° C. to a temperature of 1300° through 1450° C. with a single-shot addition of fuel before it is introduced into the rotary tubular kiln so that the burning product and the combustion exhaust gases are in concurrent flow. These proposals would seem to offer the possibility in addition to attaining a reaction kinetic advantage of adapting the rotary kiln to the demands of sintering, from which a cost saving, considerable shortening of the rotary tubular kiln would result.

More advanced proposals completely eliminate the rotary tubular kiln and transfer both the heating of the deacidified product to sintering temperature as well as the sintering itself into a suspension stream (German AS 25 50 384). Since only a very short time span is available for the sintering in such a method, a very high sintering temperature must be reached because a complete lime bonding would not be attainable even with a partially recirculating product. This presents a rather considerable problem in operation of such installations because more of the product becomes molten with increasing sintering temperatures, leading to cakings at the necessarily cooler reactor walls. This danger of reaching too high a sintering temperature and/or cakings of product components which have become molten also exists in a similar form for heating assemblies which heat the calcined burning product only up to the temperature ranges standard for sintering in the rotary tubular kiln with single addition of fuel and combustion air because topical overheatings cannot be excluded.

SUMMARY OF THE INVENTION

The present invention seeks to make the advantages of rapid heating of calcined material to the sintering temperature controllable in a separate heating assembly but at the same time preventing the danger of cakings in the assembly which would disrupt continuous operation.

In the present invention, this objective is achieved in that the quantity of heat required for the rapid heating of the product is released in metered fashion in the heating assembly and is immediately absorbed by the product by providing a plurality of fuel feeds and/or combustion air feeds distributed at spaced points over the heating assembly. The heat can be directly transmitted to the product to be heated, for example, by means of burning fuel in the product which is suspended in the exhaust air of the clinker cooler and/or in the exhaust gas of the burning assembly. Alternatively, the heat can be indirectly transmitted, for example, by means of irradiation.

In the method of the invention, the release of heat necessary for heating the calcined product to its sintering temperature is deliberately distributed over many locations of the heating assembly and only to such a limited amount as can be immediately absorbed by the combustion product in suspension without reaching a temperature which would cause the formation of melt components and which would effect a sticky consistency of the product even in a part of the stream of burning product.

In a further feature of the present invention, using solid, liquid or gaseous fuels, such fuels can be partially pre-oxidized outside of the heating assembly and the sensible exhaust gas heat and the residual oxidation heat of the fuel can be employed for heating the product. Different fuels or fuel mixtures matched to their respective purposes can be employed in the heating assembly, in the calciner preceding the heating assembly, and in the subsequent burning assembly. Particularly low-grade fuels, for example, coal having an extremely high ash content, can be employed in the heating assembly whereby the regulation of the fuel feed becomes less sensitive in an advantageous manner, the avoidance of crust formations is promoted, and the bonding of ash in the sintering product is optimally designed.

In a further feature of the invention, at least a part of the exhaust gases of the heating assembly and/or at least a part of the exhaust gases of the burning assembly can be separately withdrawn and treated as bypass gases and bypass dusts having specific, different compositions. In particular, alkali chlorides can be withdrawn as harmful substances in bypass gases from the heating assembly and alkali sulfates can be withdrawn as harmful substances with the bypass gases of the sintering assembly. The deliberate interruption of circulation of volatile material components by means of a bypass of the exhaust gases of the heater is economically justifiable since only a relatively small part of the overall quantity of heat is supplied to the heating assembly and the heat losses of the bypass are thus kept slight due to the small amount of exhaust gas. Moreover, the product traverses a temperature range in the heating assembly which is particularly favorable for the volatilization of certain salts, for example, alkali chlorides. Such a bypass can, therefore, achieve a hitherto unknown effectiveness.

The apparatus for carrying out the method is characterized in that the heating assembly is connected to at least one exhaust air line from the clinker cooler and/or is connected to the exhaust gas line of the sintering assembly. It is designed as a flow channel into which the supply line for the calcined raw material as well as a plurality of fuel introductions and/or combustion air introductions distributed over the channel discharge. According to a special feature of the invention, the flow channel of the heating assembly can be designed as a double-walled structure having an inside wall which consists of a fireproof lining having a multitude of pores or grooves extending therethrough at right angles relative to the flow channel. The hollow clearance between the inner wall and the outer wall of the flow channel is connected to the supply line for combustion air, particularly to an exhaust air line of the clinker cooler. The fireproof lining of the heating assembly which consists of a porous material which allows fuel or air to pass produces a double advantage. On the one hand, the continuous and metered release of heat is promoted and on the other hand the suspension stream in the heating assembly is surrounded by the gas penetrating from the outside toward the inside and product particles are thus prevented from having direct contact with the wall surfaces whereby crust formation is inhibited in an advantageous manner.

BRIEF DESCRIPTION OF THE DRAWINGS

The invention with its further features and advantages will be explained in greater detail with reference to the sample embodiments schematically illustrated in the Figures.

DESCRIPTION OF THE PREFERRED EMBODIMENTS

Figure 1:
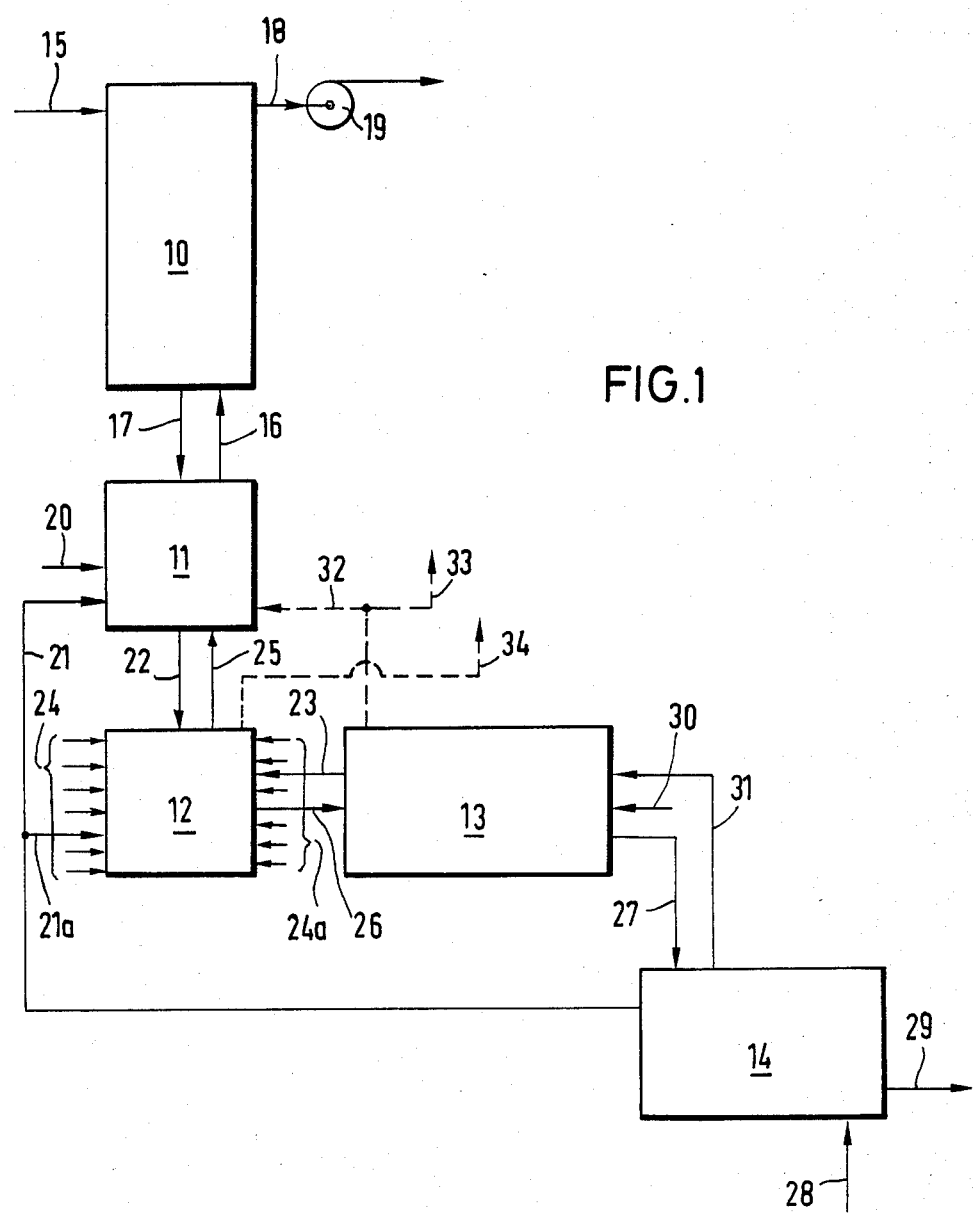
FIG. 1 is a block diagram of the method of the present invention for burning fine grained product having a separate heating assembly preceding a sintering kiln on the product side.

In FIG. 1, the heat treatment system of the present invention for manufacturing cement clinker from raw cement meal includes a raw meal preheater 10, a calciner 11 following the preheater 10, a heating assembly 12 following the calciner 11, a rotary tubular kiln 13 and a clinker cooler 14. The raw meal preheater 10 is designed as a suspension type heat exchanger which functions with countercurrent flow of gas and product. Fine-grained raw cement meal is delivered into the upper area of the preheater 10 as shown by the arrow 15 and in a plurality of heat exchanger cyclones shown in FIG. 2, which are disposed step-wise, accomplishes a heat exchange with hot exhaust gases supplied from the calciner 11 as shown by the arrow 16. After cooling due to heat exchange with the preheated product, the gases leave the preheater 10 through an exhaust gas line 18 by means of an exhaust gas blower 19.

The preheated product leaves through the line 17 and is calcined in the calciner 11 upon the addition of fuel through a line 20 and hot exhaust air from a line 21 which originates in the clinker cooler 14. The product leaves the calciner 11 with a temperature of approximately 900° C. through a line identified at reference numeral 22. In the heating assembly 12, the product is suspended in exhaust air appearing through a line 21a from the clinker cooler 14 and/or in an exhaust gas stream appearing from line 23 of the rotary tubular kiln 13 and is quickly heated to the temperature of incipient alite formation, i.e., approximately 1250° C. by means of a plurality of fuel introduction points 24, 24a distributed over the heating assembly 12 in such a manner and in such an amount as can be immediately absorbed by the burning product. The exhaust gases from the heating assembly 12 are conveyed by means of a line 25 to the calciner 11 and the heated burning product leaves by means of a line 26 and enters the rotary tubular kiln 13. In the kiln 13, there is a countercurrent flow between combustion gas and product resulting in the sintering of the material into a clinker which leaves the kiln 13 through a line 27. After cooling in the cooler 14 by means of cooling air received through a line 28, the cooled cement clinker is discharged through a line 29 to a suitable grinding apparatus.

A burner 30 is provided for the rotary tubular kiln 13, and a further exhaust air conduit 31 from the clinker cooler 14 supplies hot cooler exhaust air to the rotary tubular kiln 13 as secondary air.

It will be seen from FIG. 1 that the exhaust gas of the rotary tubular kiln 13 instead of being conducted through a conduit 23 to the heating assembly 12 can also be conducted directly to the calciner 11 by means of a conduit 32 shown in broken lines while bypassing the heating assembly 12. In that case, the heating assembly 12 is only supplied with cooler exhaust air from a line 21a (tertiary air). The exhaust gases from the rotary tubular kiln 13 instead of being supplied to the heating assembly 12 and/or to the calciner 11 can also be withdrawn over a bypass 33. The exhaust gas appearing in the line 25 from the heating assembly 12 instead of being conveyed to the calciner 11 can also be withdrawn over a bypass line 34. The dusts contained in the bypass gas lines 33 and 34, having specific, differing compositions, for example alkali sulfates on the one hand and alkali chlorides on the other can be extracted separately from one another.

Figures 2, 3, 4:
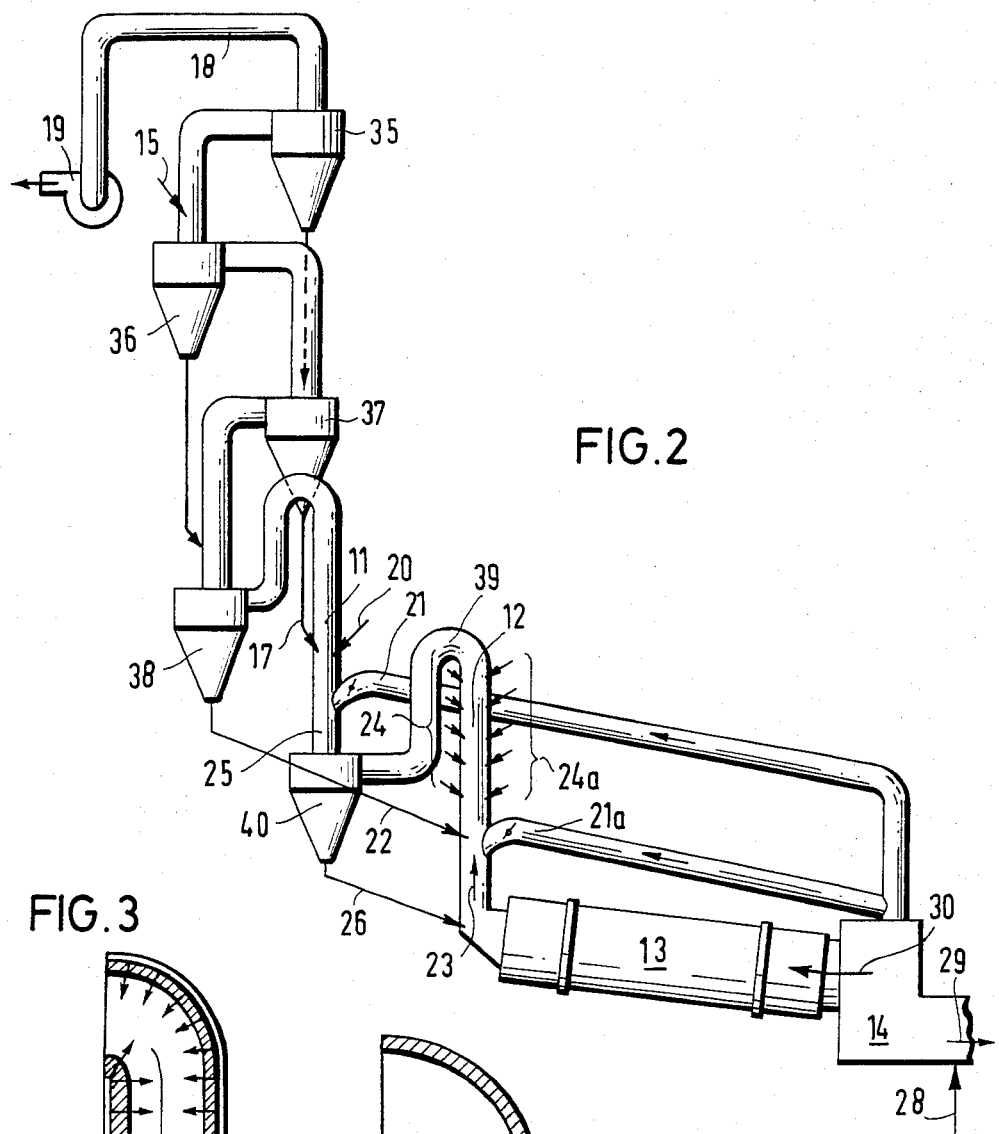
FIG. 2 illustrates the burning installation of FIG. 1, shown in greater detail and more specifically.
FIG. 3 illustrates a portion of the heating assembly modified from that shown in FIG. 2 and enlarged in section.
FIG. 4 is a further fragmentary cross-sectional view of a modified heating assembly which can be employed in the present invention.

A more specific showing of the assembly is found in FIG. 2 where the parts coinciding with those of FIG. 1 are provided with the same reference numerals. It will be seen that the raw meal preheater 10 consists of series of cyclone heat exchangers 35, 36 and 37. The preheated product in the line 17 leaves the heat exchanger cyclone 37 and is suspended in the calciner 11 in hot exhaust air from the line 21 connected to the clinker cooler 14 and/or in exhaust gas from a line 25 of the heating assembly 12. The product is brought to a temperature of approximately 900° C. with the addition of fuel through a line 20 and is thereby completely calcined. The calcined product is withdrawn by means of a line 22 and is separated from the exhaust gas stream in a separator such as a cyclone 38 whereupon it is introduced into the lower range of the heating assembly 12 which is designed as a shaft-like suspension reactor. This reactor is disposed essentially perpendicular to the exit end of the kiln 13 and is located on the exhaust gas conduit 23 emerging from the rotary tubular kiln 13. At the lower end of the suspension reactor there is a tertiary air conduit 21a from the clinker cooler 14. A plurality of fuel introduction points 24, 24a are distributed over the channel discharge into the flow channel of the heating assembly 12 whereby the fuel heat is released in metered fashion and the released heat is immediately absorbed by the calcined product so that the product is quickly heated to the temperature of incipient alite formation, approximately 1250° C., without the danger of exceeding the critical melt phase temperature and thus without the danger of encrustations. A downwardly extending pipe loop 39 is attached to the upper end of the heating assembly 12 designed as a shaft-like suspension reactor, the pipe loop 39 leading to a separating stage for separating gas and product such as a cyclone 40 from which heated product leaves through a line 26 separated from an exhaust gas which leaves by means of a line 25 which delivers the gas to the calciner 11. In the absence of a separating stage 40, the heated product in line 26 together with the exhaust gas is introduced into the rotary tubular kiln 13 which does not then function in countercurrent flow but with concurrent flow between gas and product. In this instance, the heated product suspended in the exhaust gas is directed to the inside wall of the rotary tubular kiln 13 in such manner that it quickly deposits at the inside wall in the form of a product bed which is facilitated when the pulsations of the heated product flowing from the heating assembly 12 coincide with the moment of momentum of the rotary tubular kiln 13.

In FIG. 3 there is shown a heating assembly 12a which does not contain a plurality of fuel introductions but instead contains a plurality of combustion air inlets 41 distributed over the suspension reactor. To that end, the flow channel of the heating assembly 12a is designed as a double-walled structure with an inside wall 14 consisting of a fireproof lining having a multitude of pores or grooves 43 at right angles to the flow channel. A hollow clearance 44 between the inner wall 42 and the outer wall 45 of the flow channel is connected to a supply line for combustion air, such as an exhaust air line 21a from the clinker cooler 14. The calcined burning product introduced as indicated by the arrow 22 is suspended in combustion air delivered by means of lines 21a from the clinker cooler as well as in the rotary tubular kiln exhaust gas indicated by the arrow 23 flowing from bottom to top. Fuel is introduced as indicated by the arrow 46 into the heating assembly 12a. The amount of combustion air entering through the plurality of combustion air apertures 41 is individually set such that the fuel oxidizes step-wise and the quantity of heat thereby released step-wise is always immediately absorbed by the burning product. Consequently, the burning product is quickly and uniformly heated without danger of reaching the critical melt temperature of the burning product and thus without the danger of encrustations. The forms of the inventions shown in FIGS. 2 and 3 can be combined with one another insofar as a suspension reactor can be equipped with both a multitude of fuel introduction points, 24, 24a, distributed over the flow channel as well as with a plurality of combustion air introduction points 41.

With reference to FIG. 4 there is shown a heating assembly 12b wherein the heat is indirectly transmitted to the burning product appearing as indicated by the arrows 22 by means of induction heating coils 47, electrical resistance heating, infrared heating, or the like. For the purpose of transporting the burning product to be heated through the heating assembly 12b, the burning product is suspended in a carrier gas as indicated by the arrow 23 which is preferably the exhaust gas of the rotary tubular kiln 13.

It will be understood that various modifications can be made to the described embodiments without departing from the scope of the present invention.

We claim as out invention:

1. In a method for heat treating a largely calcined fine grained product consisting predominantly of lime wherein said product is heated in a heating assembly from a temperature of about 900° C. to a temperature of approximately 1250° C., the heated product is then sintered into clinker in a burning assembly, and then passed to a clinker cooler, the improvement whereby rapid heating and absorption of heat takes place in said heating assembly which comprises:

introducing a metered amount of heat into said heating assembly through a plurality of spaced points along said heating assembly.

2. A method according to claim 1 in which fuel is introduced through said spaced points.

3. A method according to claim 1 in which combustion air is introduced through said spaced points.

4. A method according to claim 1 which comprises:
suspending said product in exhaust air from said clinker cooler, and burning fuel in the resulting suspension.

5. A method according to claim 1 which comprises:
suspending said product in exhaust air from said burning assembly and burning fuel in the resulting suspension.

6. A method according to claim 1 which comprises:
transmitting heat indirectly to said product in said heating assembly by irradiation.

7. A method according to claim 2 which includes the step of preoxidizing said fuel outside the heating assembly and utilizing the sensible exhaust gas heat and the residual oxidation heat of the fuel to heat said product.

8. A method according to claim 1 wherein different fuels are used in the heating assembly and burning assembly, depending upon the amount of heat required.

9. A method according to claim 1 which includes the steps of withdrawing at least a portion of the exhaust gases from said burning assembly and withdrawing at least a portion of the exhaust gases from said heating assembly of different composition than the exhaust gases from said burning assembly.

10. A method according to claim 9 which includes the steps of withdrawing alkali chlorides in the exhaust gases of the heating assembly and alkali sulfates from the exhaust gases of the sintering step.

11. A method according to claim 1 in which:
the product in said heating assembly is in the form of an overflowing fluidized bed.

12. An apparatus for manufacturing cement clinker from raw cement meal comprising:
a raw meal preheater,
a calciner receiving the meal from said preheater,
a heating assembly receiving the calcined meal from said calciner,
a burning assembly receiving the heated calcined meal from said heating assembly,
a clinker cooler receiving clinker from said burning assembly,
at least one exhaust air conduit directing exhaust air from said clinker cooler to said heating assembly,
means for introducing calcined meal into said exhaust air conduit, and
means for introducing fuel at spaced points into said exhaust air conduit.

13. An apparatus according to claim 12 which also includes:
means for introducing combustion air at spaced points into said exhaust air conduit.

14. An apparatus according to claim 12 wherein the heating assembly comprises a shaft type suspension reactor mounted perpendicularly to the exhaust gas line on said burning assembly.

15. An apparatus according to claim 12 in which said exhaust gas conduit consists of a double-walled structure having an inner wall composed of a fireproof lining having gas passages therethrough, said inner wall being spaced from the outer wall of said conduit, and
means for introducing exhaust air from said clinker cooler into the space between the inner and outer walls.

16. An apparatus according to claim 14 which includes a downwardly extending pipe loop at the upper end of said shaft type suspension reactor.

17. An apparatus according to claim 12 which includes a separator for separating gas and product disposed between said heating assembly and said burning assembly.

18. An apparatus according to claim 12 in which said heating assembly comprises a fluidized bed reactor with an overflowing fluidized bed.

* * * * *